United States Patent [19]
Ruottu

[11] Patent Number: 5,167,932
[45] Date of Patent: Dec. 1, 1992

[54] CIRCULATING FLUID BED REACTOR

[75] Inventor: Seppo Ruottu, Karhula, Finland

[73] Assignee: Foster Wheeler Energy Corporation, Clinton, N.J.

[21] Appl. No.: 276,442

[22] Filed: Nov. 25, 1988

Related U.S. Application Data

[63] Continuation of PCT/FI87/00039, Mar. 19, 1987.

[30] Foreign Application Priority Data

Mar. 24, 1986 [FI] Finland .................................. 861224

[51] Int. Cl.$^5$ ............................................. F27B 15/16
[52] U.S. Cl. ........................................ 422/146; 55/345;
55/348; 55/349; 110/245; 431/7; 431/170;
122/4 D; 422/145; 422/147
[58] Field of Search ........................ 422/146, 147, 145;
34/57 A; 110/245; 431/7, 170; 122/40; 55/345,
348, 349

[56] References Cited

U.S. PATENT DOCUMENTS

| 4,664,887 | 5/1987 | Engstrom | 422/147 |
| 4,867,948 | 9/1989 | Ruottu | 422/147 X |
| 4,900,516 | 2/1990 | Engström et al. | 422/147 |

Primary Examiner—Robert J. Warden
Assistant Examiner—Amalia L. Santiago
Attorney, Agent, or Firm—Marvin A. Naigur

[57] ABSTRACT

A circulating fluid bed reactor comprises a reactor chamber having a circumscribing wall, a particle separator to receive a particle - gas suspension from the reactor chamber, and means for returning the particles separated by the particle separator to the reactor chamber. In order to eliminate problems due to heat expansion of the parts of the reactor and to provide a simple structure, the particle separator has at least one cyclone having a chamber with a cylindrical outer surface forming a part of the circumscribing wall of the reactor chamber.

4 Claims, 1 Drawing Sheet

FIG. 1
FIG. 2
FIG. 3
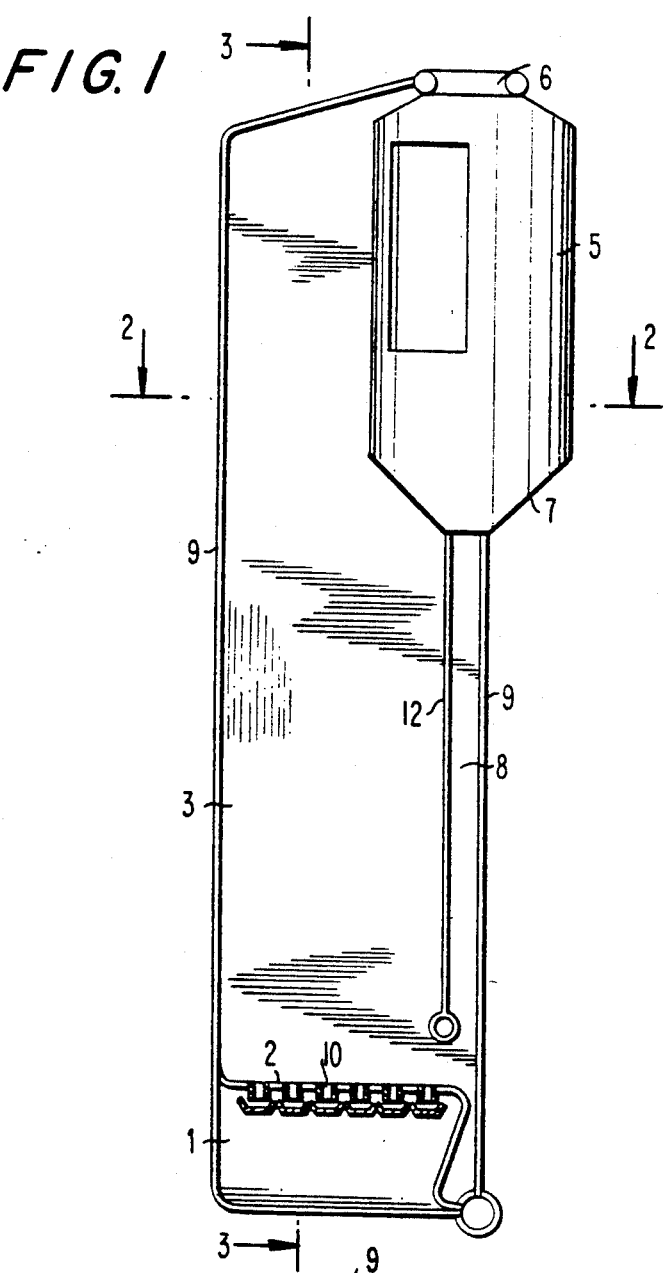
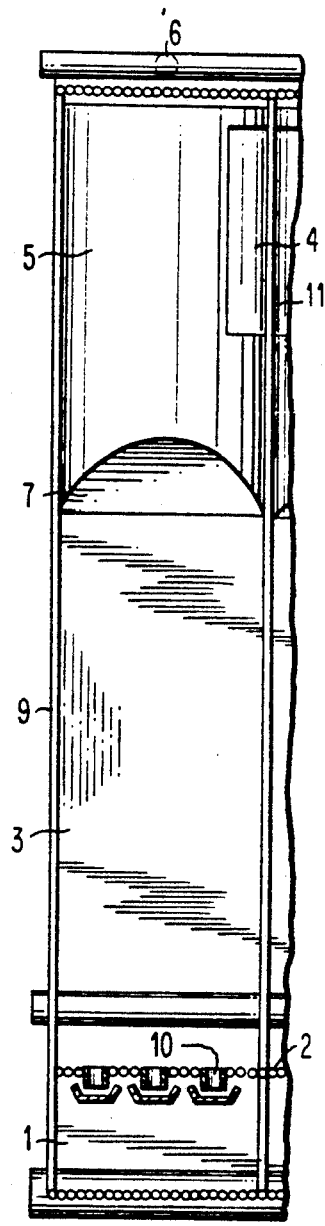
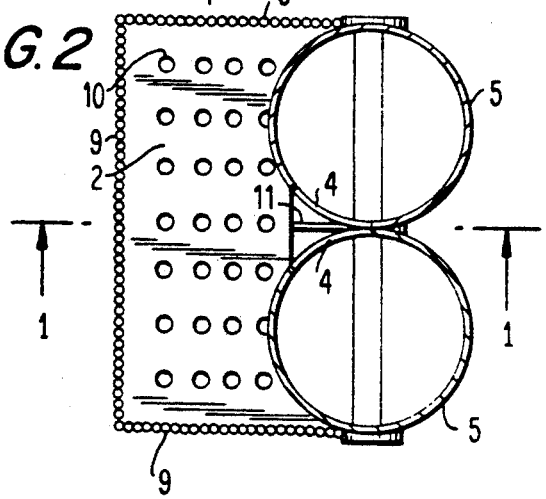

CIRCULATING FLUID BED REACTOR

This application is a continuation of international application PCT/FI 87/00039, filed Mar. 19, 1987.

DISCUSSION OF THE BACKGROUND

The invention relates to a reactor system comprising a reactor chamber having a circumscribing wall, a particle separator adapted to receive a particle-gas suspension from the reactor chamber and means for returning the particles separated by the particle separator to the reactor chamber, which system is here called a circulating fluid bed reactor.

Circulating fluid bed reactors are getting more general in energy technical applications, because in those, discharges of sulphur and nitric dioxides can at low cost be reduced to levels set by government regulation. When burning materials containing especially sulphur, the economic competitiveness of a circulating fluid bed reactor is excellent, when the caloric capacity of the arrangement is less than 200 MW. This limit of capacity will undoubtedly rise, when the technological readiness and experiences from bigger units increase.

In energy technical applications, the purpose of the burning in the first place is to produce heat energy, which shall be transferred further to the coolant of the reactor, which coolant most generally is water. Therefore, the walls of the reactor chamber are usually made of gas tight panels formed of cooling pipes and fins connecting the pipes. On the other hand, it has traditionally been necessary to build the particle separators and the return equipment for solids as an uncooled construction by insulating the supporting structure made of steel with inner ceramic insulators from hot particle-gas suspension. The advantage of this construction is that both the reactor and the particle separator are simple as such and a good deal of experience has already flown in from their ability to function. On the other hand, the whole reactor unit consisting of these components of entirely different structure is not adapted to this purpose.

The biggest problem of the construction described is to connect components with different heat expansion with each other. The massive particle separator, the ceramic parts of which have a thickness of approximately 300 mm, must be supported on the bottom level and provided with a self-supporting jacket of steel. The reactor portion of panel construction is preferably supported from above, whereby it is heat-expanding mainly downwards. Especially in big units, a cooling portion supported from above is the only possibility to be considered. In the fired condition, the typical temperature of a cooled panel structure is about 300° C., while the temperature of the steel jacket of the particle separator is 80° C. at the most, both for safety reasons and to control heat losses. Thus, it is clear that in transient heating and cooling situations, the fastening points of the reactor portion and the particle separator move remarkably with respect to each other. These movements occuring in three vertical directions must be considered when planning structure for their connection.

Another significant disadvantage of a conventional circulating fluid bed reactor is its great bulkiness, because the particle separators having mainly the same dimensions as the reactor portion are located at an unnecessary distance from the reactor portion.

The location of the particle separators far from the reactor chamber causes another disadvantage at the same time. The return equipment shall attend to a horizontal transportation of solids from the middle axis of the separator back into the reactor. Therefore, for the return channel system, complicated equipment for adjusting the gas flow must be provided, which equipment most usually is carried out by means of a separate fluidized bed located in the return channel.

In addition to the inconveniences described above, a conventional circulating fluid bed reactor is unnecessarily expensive and exposed to damage. Especially the junctions between the reactor and the particle separator need regular care.

SUMMARY OF THE INVENTION

By means of the solution of the invention, the disadvantages mentioned above can be avoided. This is achieved according to the invention so that the particle separator comprises of at least one cyclone having a chamber with an essential cylindrical outer surface forming a part of the circumscribing wall of the reactor chamber.

As the main advantage of the invention can be considered that the reactor system easily can be built as a compact, entirely cooled panel construction taking up only little space. By means of the construction according to the invention, it is additionally possible to avoid the complicated equipment exposed to damages for adjustment of gas flow.

Other substantial advantages to be achieved are that the problems due to heat expansion are eliminated. The whole reactor can be supported as a conventional suspended structure, which is the only possible way for big boilers. Additionally, the need of space and the total mass of the reactors are substantially reduced compared with reactors used for the time being.

Additional advantages will be achieved when the bottoms of the cyclones are planar and connected with a slot-like return channel formed of vertical, cooled surfaces. This kind of return channel works at the same time as a regulating heat transferer equalizing variations in reactor temperature.

BRIEF DESCRIPTION OF THE DRAWINGS

In the following the invention will be described in more detail with reference to the attached drawings, wherein FIG. 1 shows a vertical symmetrical section of a circulating fluid bed reactor according to the invention, FIG. 2 shows a section from the reactor taken along line 2—2 of to FIG. 1 and FIG. 3 shows a section taken along line 3—3 of FIG. 1.

DESCRIPTION OF THE PREFERRED EMBODIMENT

FIG. 1 shows a vertical symmetrical section of a circulating fluid bed reactor with two particle separators and having an entirely cooled structure formed of pipe and fin construction. Numeral 1 relates to a draft plenum formed of panel walls and having a roof 2 formed of a nozzle bottom with nozzles 10, which bottom is formed of an extension of the panel walls. Above the nozzle bottom, there is a reactor chamber 3, defined in part by a circumscribing wall 9 of pipe and fin construction. At the top of which there are two particle separators e.g. cyclones 5, partially arranged inside the reactor chamber. A gas including particles is led into the particle separators through inlets 4, the suitable gas speed being between 7 and 40 m/s. The inlet has preferably a form where height is substantially greater than the breadth (ratio 2-7). To control the flow, it is preferable to form a wall 11 of pipes to be bent at the inlets, which wall separates the inlets of the cyclones from each other. It is also possible that one big inlet 4 is replaced with several smaller openings the number of which can be in the order of tens. This improves the separation ability of the cyclone, and in this way it can also be avoided that the inlet becomes unreasonably high in big units. The gases discharge from the cyclone through a discharge outlet 6, while the solids flow on the planar bottoms 7 of the cyclone, which bottoms are declined preferably by 15-45 degrees, so that the particles flow further to the upper end of the return channel 8 formed by cooperation between the circumscribing wall 9 and an interior wall 12. The breadth of the return channel is chosen so that no vertical gas flow disturbing the function of the cyclone occurs through it. A stabilization of the gas flow can also be provided by locating the lower end of the return channel 8 in a thick fluidized bed zone formed at the lower end of the reactor chamber 3. Because the caloric capacity transferred in the return channel is directly proportional to the solids flow in the channel, the construction described works at the same time as a temperature equalizer of the reactor when the effect is varying.

FIG. 2 shows the circulating fluid bed reactor on a horizontal plane cutting the lower ends of the cyclones 5.

FIG. 3 shows the circulating fluid bed reactor on a vertical plane parallel to the reactor wall opposite to the cyclones.

It is evident that, it is possible to realize the reactor of the invention also as an uncooled construction, as to the particle separator, whereby, however, the advantages of the invention can be utilized only partially. Also in this alternative, the construction of the return line will, however, be substantially simplified, because there is no need to transport solids horizontally.

I claim:

1. A circulating fluid bed reactor comprising:
   a circumscribing wall of pipe and fin construction to receive cooling water and partly defining a reactor chamber;
   a least one vertically-oriented cyclone having a substantially cylindrical wall of substantially vertical orientation and a bottom cooperating with the substantially cylindrical wall to define a separation chamber of the cyclone, a portion of the substantially cylindrical wall of the cyclone being a portion of said circumscribing wall, said portion of the wall of the cyclone being exposed to the reactor chamber, the at leas one cyclone being in fluid communication with the reactor chamber for receiving a particle - gas suspension from the reactor chamber and for returning separated particles to the reactor chamber through a particle opening formed in said bottom of the cyclone; and
   an additional wall extending from the particle opening formed in the bottom of the cyclone, the additional wall partly defining the reactor chamber and cooperating with the circumscribing wall to define a return channel for passing particles form the particle opening in the bottom of the cyclone to the reactor chamber.

2. The reactor of claim 1, wherein the bottom of the cyclone comprises planar surfaces that slope downwardly toward each other to the particle opening in the bottom of the cyclone.

3. The reactor of claim 1 or 2, wherein the additional wall is of tube and fin construction adapted to receive cooling water and extends vertically downwardly from the particle opening in the bottom of the cyclone, wherein the return particles may be passed along a path having substantially no horizontal component.

4. The reactor of claim 1, wherein the at least one cyclone is in fluid communication with an upper portion of the reactor chamber through a plurality of openings formed in the circumscribing wall for the passage of the particle - gas suspension.

* * * * *